United States Patent [19]

Peirce et al.

[11] Patent Number: 5,690,293

[45] Date of Patent: Nov. 25, 1997

[54] BELT DRIVE MECHANISM FOR A TAPE DRIVE

[75] Inventors: Robert H. Peirce, Del Mar; Hans Graafmans, Huntington Beach, both of Calif.

[73] Assignee: Seagate Technology, Inc., Scotts Valley, Calif.

[21] Appl. No.: 555,645

[22] Filed: Nov. 13, 1995

[51] Int. Cl.$^6$ .............................. G11B 15/32; G11B 5/008
[52] U.S. Cl. .................................. 242/354; 360/96.4
[58] Field of Search ........................... 242/349, 338, 242/356.7, 540, 545, 564.3, 354; 360/96.3, 96.4, 93

[56] References Cited

U.S. PATENT DOCUMENTS

| | | | |
|---|---|---|---|
| 4,460,136 | 7/1984 | Osanai | 242/356.7 |
| 4,982,911 | 1/1991 | Newell | 242/356.7 |
| 5,169,089 | 12/1992 | Miyamoto | 242/356.7 |
| 5,210,664 | 5/1993 | Perona | 360/93 |

*Primary Examiner*—John Q. Nguyen
*Attorney, Agent, or Firm*—Lowe, Price, LeBlanc & Becker

[57] ABSTRACT

A tape drive has a belt drive mechanism to rotate a cartridge roller. The belt drive mechanism includes a motor rotating a wheel mounted on a separate shaft using a belt. The movement of the belt is directly transferred to the cartridge roller due to the friction between the belt and the cartridge roller. A cushion of an elastomeric material is wrapped around the periphery of the wheel to cushion the belt and allows the belt to wrap slightly around the cartridge roller to increase the contact area of the belt on the cartridge roller and increase the life of the belt. Alternatively, the wheel may be of a rigid material and the belt of an elastomeric material.

17 Claims, 8 Drawing Sheets

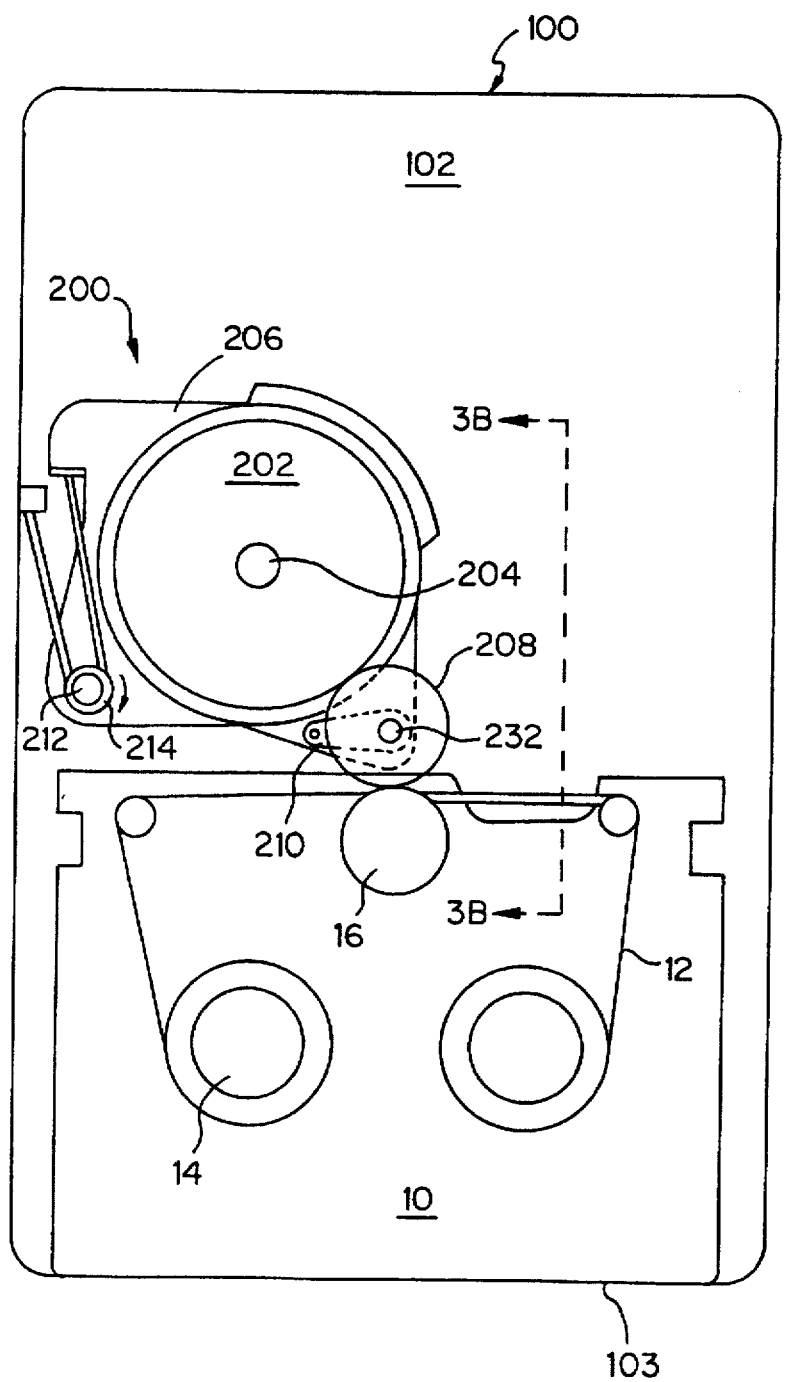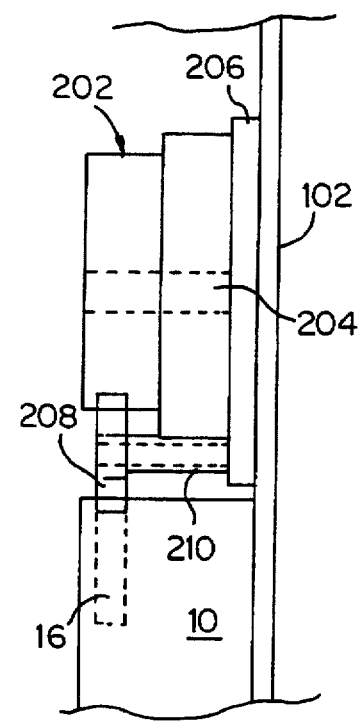
FIG. 3A
(PRIOR ART)
FIG. 3B
(PRIOR ART)

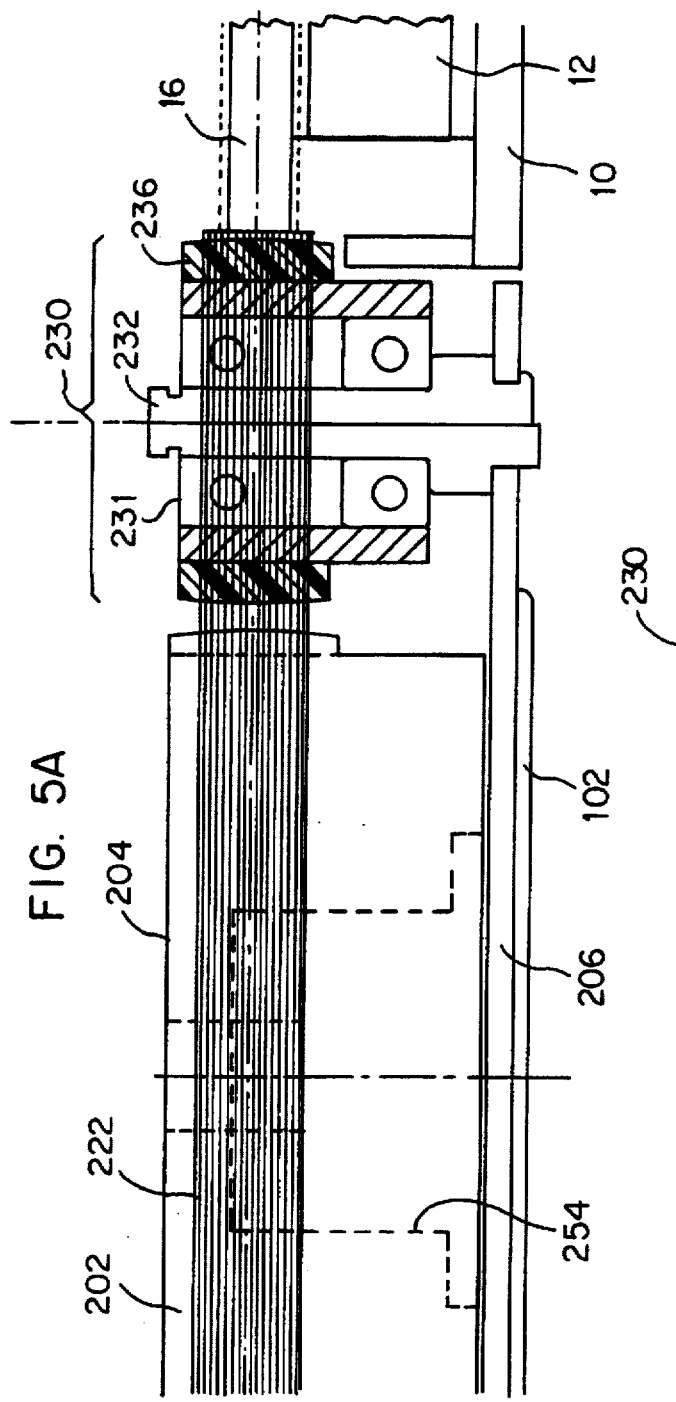

BELT DRIVE MECHANISM FOR A TAPE DRIVE

TECHNICAL FIELD

The present invention relates to a tape drive, and more particularly, a tape drive having a belt drive mechanism.

BACKGROUND ART

Early tape drives for recording and playing back digital data used a high friction roller on the motor shaft to move a cartridge roller directly. With the tape cartridge in a horizontal position, the motor was positioned vertically. These drives used a motor having a long shaft relative to the diameter, which resulted in a tape drive having increased height. Later generation motors were larger in diameter but shorter in the shaft direction, which resulted in tape drives with reduced height. However, the larger diameter motors could not be brought into direct contact with the cartridge roller. Instead, the motor usually turned a small intermediate roller, which in turn, drove the cartridge roller.

FIG. 1 illustrates a conventional tape drive 100 for writing information on or reading information recorded on a magnetic tape 12 of a tape cartridge 10. The magnetic tape 12 is wound around two reels 14 of the cartridge 10, and the reels 14 are coupled to a cartridge roller 16. The tape is wound and unwound between the reels 14 by the rotation of the cartridge roller 16. When the cartridge 10 is inserted into the tape drive 100, the cartridge roller 16 is rotated by a drive mechanism such that a read/write head (not shown) inside the tape drive reads (or writes) information from (or onto) the moving magnetic tape 12.

FIGS. 2(A–B) and 3(A–B) are detailed illustrations of a conventional drive mechanism 200 mounted to a frame 102 of the tape drive 100. FIGS. 2(A–B) illustrate the drive mechanism 200 prior to complete insertion of the tape cartridge 10 into slots 104 of the tape drive 100. The drive mechanism includes a motor 202 that rotates about a shaft 204 mounted on a plate 206. An idler 208 rotates about shaft 232 which is coupled to a movable arm 210. The arm 21 is connected to the plate 206 such that idler 208 can move from a position of non-contact with the motor 202 (see FIGS. 2(A–B)) and a position of contact between the motor 202 and the cartridge roller 16 (see FIGS. 3 (A–B)).

A pivot pin 212 connects the plate 206 to the frame 102, and a spring 214 is wrapped around the pivot pin 212. The spring 214 is unbiased or slightly biased prior to the insertion of the tape cartridge 10 into the slots 104 of the frame 100. When the tape cartridge 10 is inserted into the slots 104, the cartridge roller 16 contacts the idler 208 to move the idler 208 toward the motor 202. Once the idler 208 contacts the motor 202, the force that continues to be exerted by the insertion of the tape cartridge 10 pivots the plate 206 about the pin 212. The movement of the plate 206 biases the spring 214 such that there is a firm contact between the motor 202 and the idler 208 and between the idler 208 and the cartridge roller 16.

Based on appropriate signals, power is applied to cause the motor 202 to rotate. The rotation of the motor 202 is transmitted by friction to the idler 208 to rotate the cartridge roller 16 by friction. The tape 12 moves between the reels 14, and the information is read or written by the read/write head (not illustrated) on the tape 12. A similar drive mechanism is described in U.S. Pat. No. 5,210,664 to Perona.

Another type of drive mechanism uses a pulley-belt arrangement to rotate the cartridge roller 16, as illustrated in FIG. 4. In such a drive mechanism, a motor 202 rotates about its motor support 250 attached to a plate 206. Pulley 220 is fixed to the motor shaft 204. Belt 222 transmits the rotation of the pulley 220 to a pulley 224 at one end of counter-shaft 226. This counter-shaft 226 passes through a bearing support (housing) 252 and has wheel 228, usually elastomer coated, attached to its upper end. Wheel 228 bears against cartridge wheel 16 of tape cartridge 10. When the pulley 224 is rotated by the movement of the belt 222, the wheel 228 rotates to cause the rotation of the cartridge roller 16.

Such a pulley-belt drive mechanism has many disadvantages. Since the drive mechanism includes the counter-shaft 226 and the pulley 224, the height of the tape drive 100 is increased, reducing the compactness of the tape drive. Compared to the drive mechanism 100 having an idler 208, more components (i.e. the counter-shaft and pulley) are necessary for a pulley-belt mechanism, which increases the manufacturing costs and decreases the reliability of the tape drives. Hence, there is a need for an improved drive mechanism which allows the manufacture of more compact, less costly and more reliable tape drives.

SUMMARY OF THE INVENTION

These and other needs are met by the present invention which provides a tape drive having a belt drive mechanism to rotate a cartridge roller. The belt drive mechanism includes a motor and a pulley rotating about a motor support mounted to a plate moveable on a horizontal plane of a tape drive frame. A wheel rotates about a shaft rigidly connected to the plate. A belt wraps around the pulley and the wheel and is pinched between the wheel and the cartridge roller of a tape cartridge. The friction between the belt and the cartridge roller causes the cartridge roller to rotate when the belt is moved by the rotation of the motor.

In certain embodiments, a cushion of an elastomeric material is provided around the periphery of the wheel to cushion the belt and allow that portion of the belt in contact with the cartridge roller to wrap slightly around the cartridge roller to increase the contact area of the belt on the cartridge roller. The increase in contact area allows for more reliable contact between the belt and the cartridge roller for transfer of the motor rotation. The larger contact area also reduces the pressure on the belt to increase belt life.

The application of power causes the motor to rotate, thereby rotating the pulley. The belt moves with the pulley, and the movement of the belt is directly transferred to the cartridge roller. The rotation of the cartridge roller moves an information containing medium about a pair of reels in the cartridge. While the information medium is moving, a read/write head of the tape drive reads information from or writes information onto the information medium, such as a magnetic tape.

The foregoing and other features, aspects and advantages of the present invention will become more apparent from the following detailed description of the present invention when taken in conjunction with the accompanying drawings.

BRIEF DESCRIPTION OF THE DRAWINGS

FIG. 3A is a top view of the conventional drive mechanism of FIG. 2A after the tape cartridge has been inserted into the tape drive.

FIG. 3B is a sectional view along line 3B—3B of FIG. 3A.

FIG. 5A is a side view of a belt drive mechanism in accordance with an embodiment of the present invention.

FIG. 5D is a top view of the belt and cartridge roller interface in accordance with embodiments of the invention.

DETAILED DESCRIPTION OF THE ILLUSTRATIVE EMBODIMENTS

Figure 1:
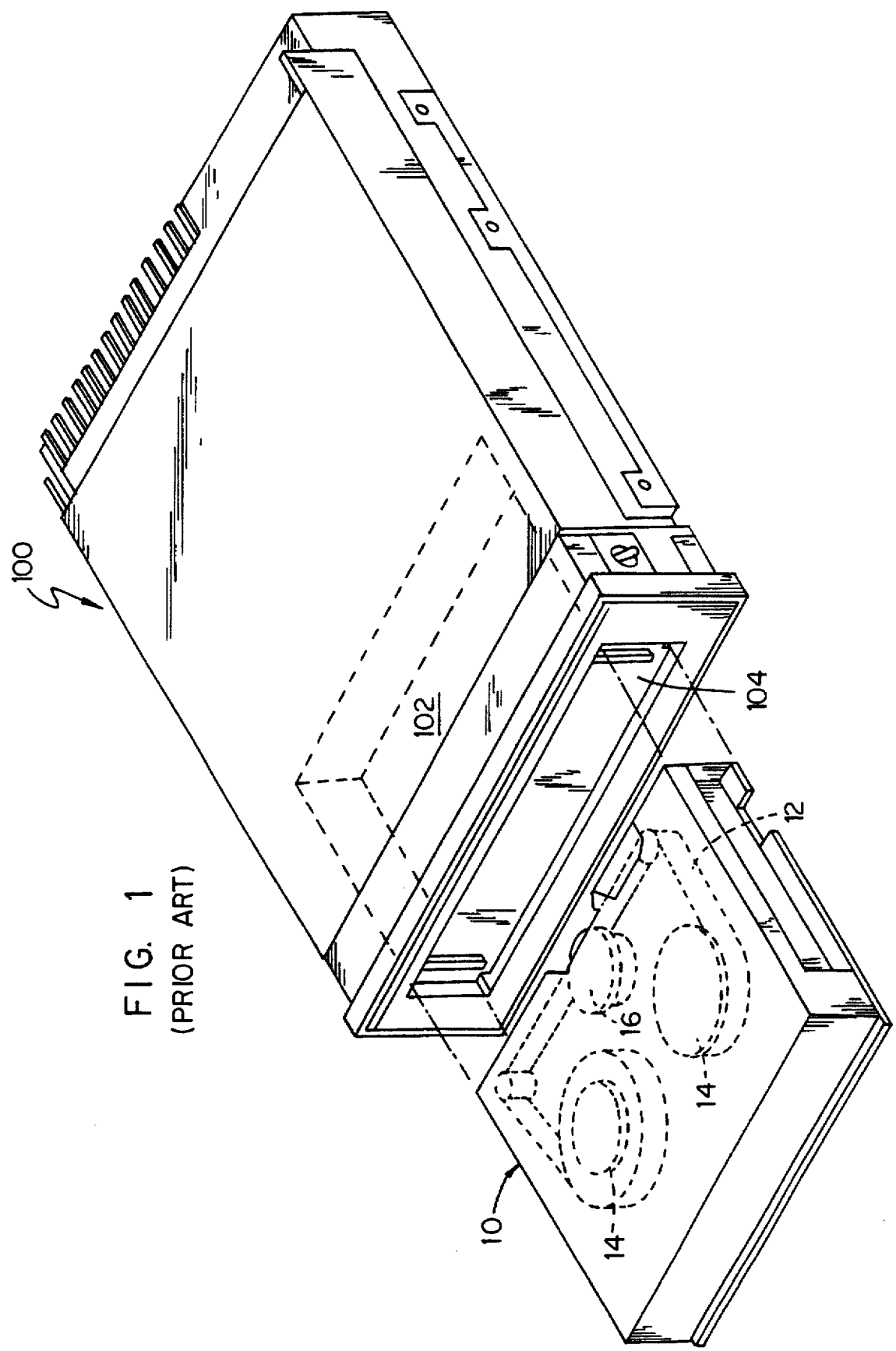
FIG. 1 is a perspective view of a conventional tape drive.
Figures 2A, 2B:
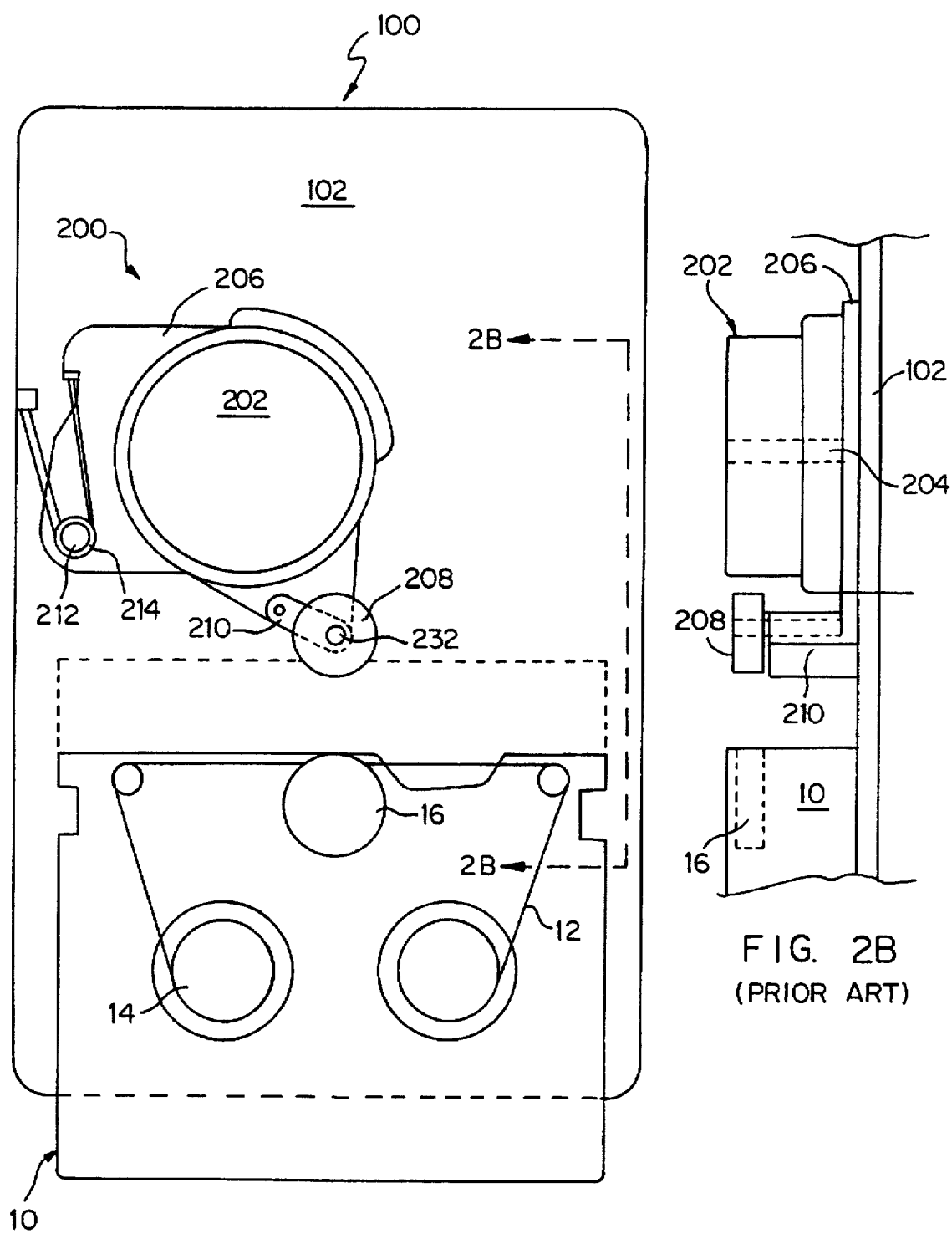
FIGS. 2A is a top view of a conventional drive mechanism of a tape drive during initial insertion of a tape cartridge into the tape drive.
FIG. 2B is a sectional view along line 2B—2B of FIG. 2A.
Figure 4:
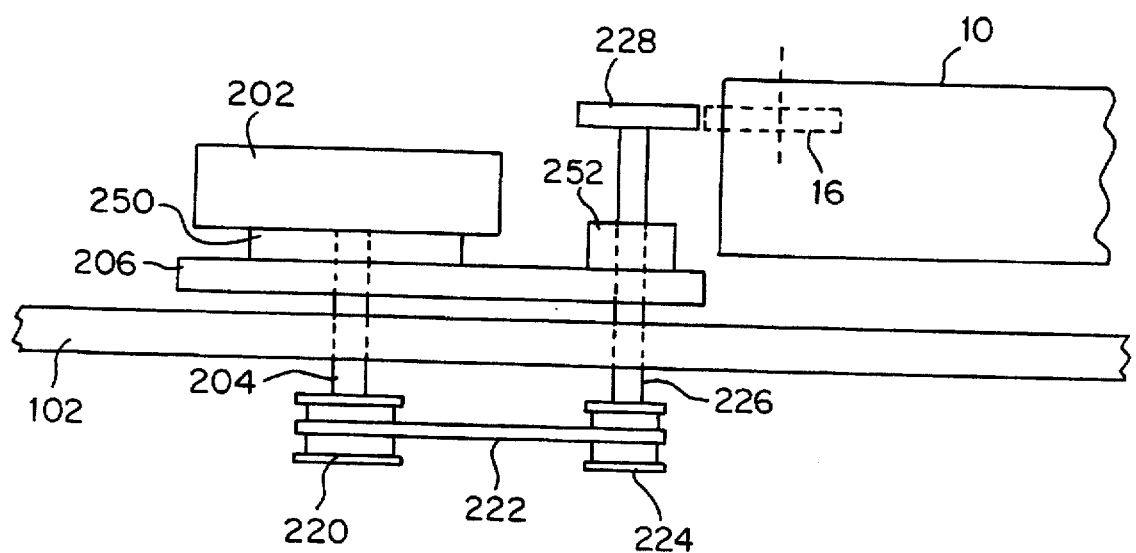
FIG. 4 is a side view of a conventional pulley-belt drive mechanism.
Figure 5B:
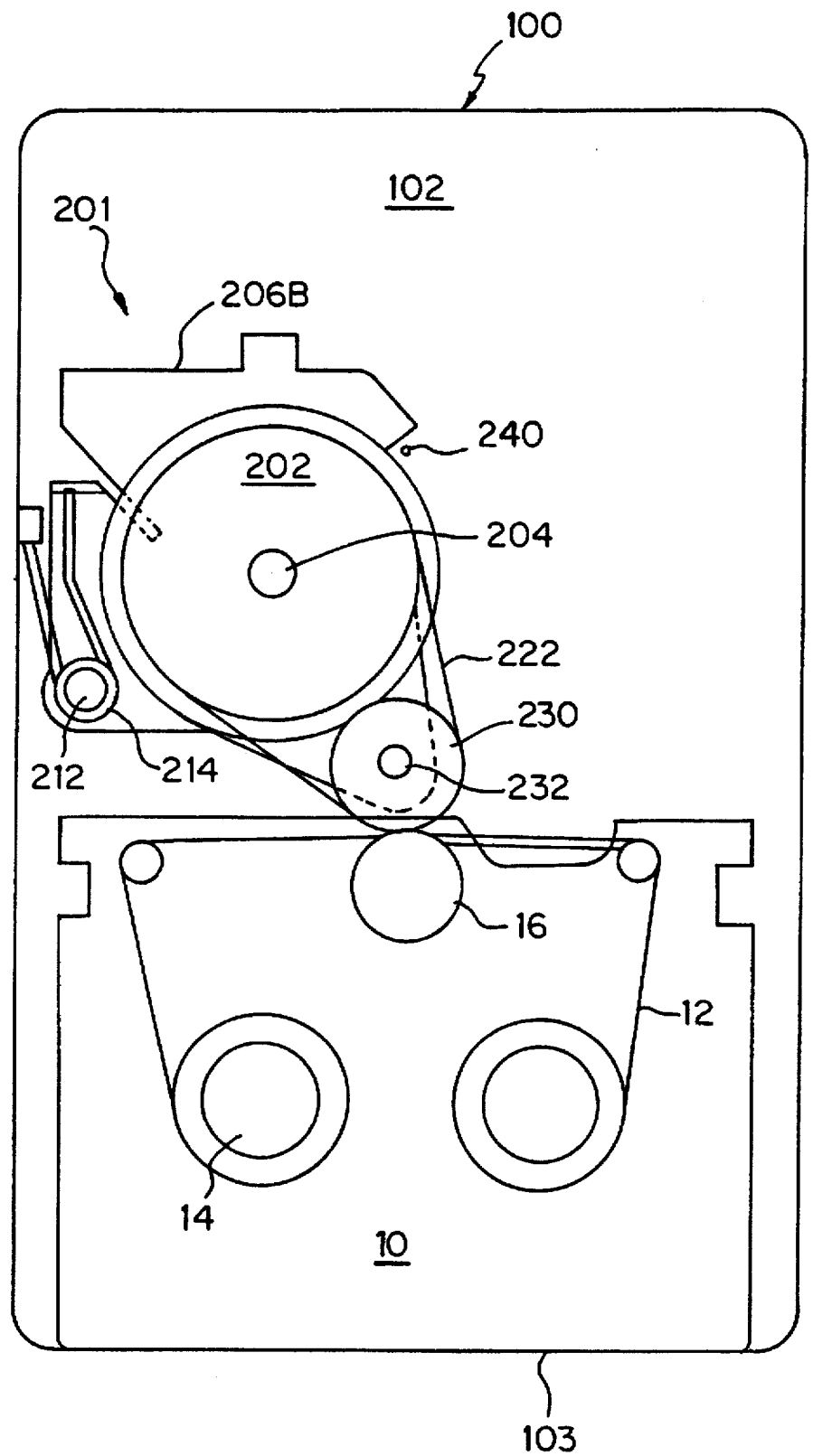
FIG. 5B is a top view of an embodiment according to the present invention for coupling a plate of a belt drive mechanism to a frame of a tape drive.
Figure 5C:
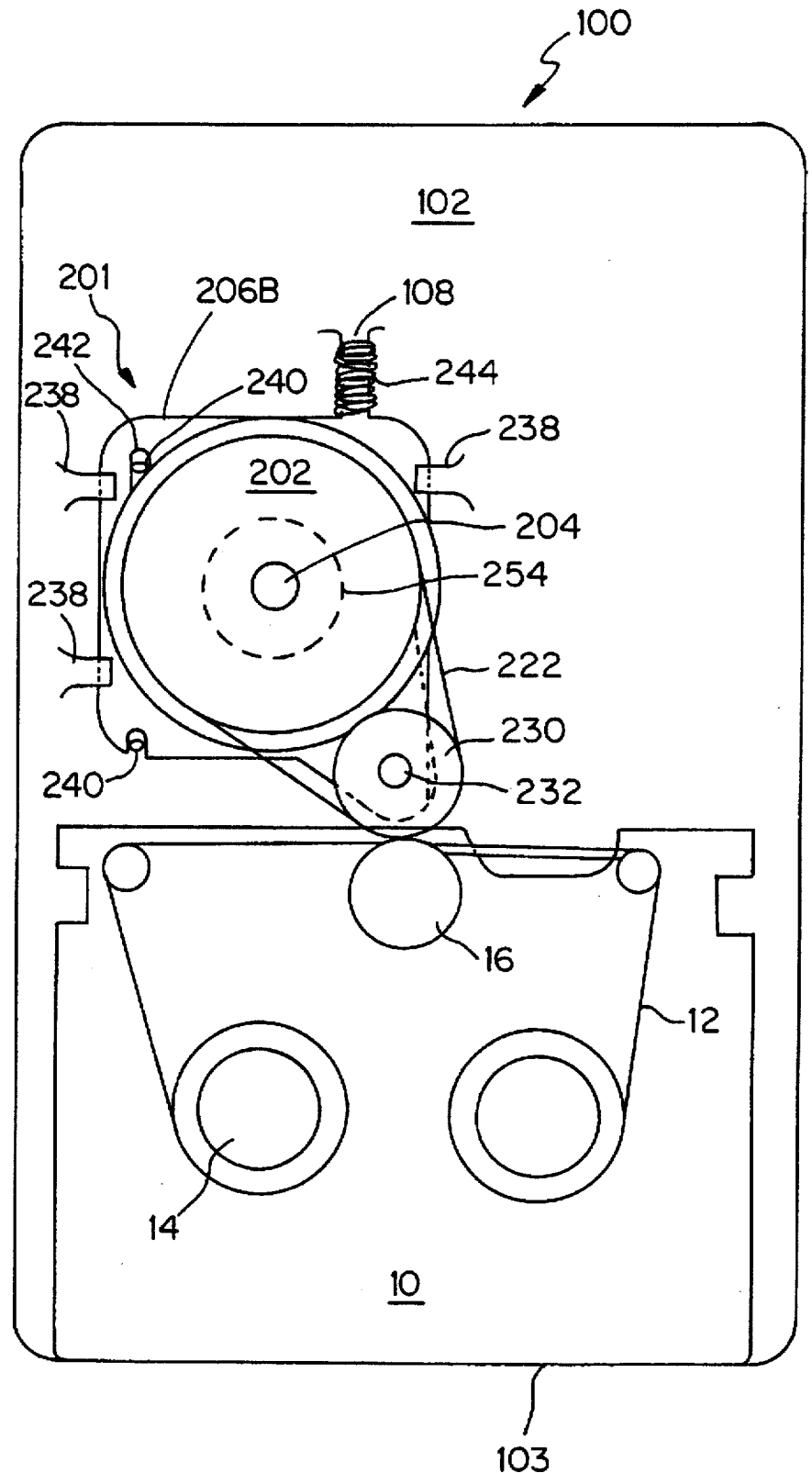
FIG. 5C is an illustration of an alternative embodiment according to the present invention for coupling a plate of a belt drive mechanism to a frame of a tape drive.

FIG. 5A illustrates an embodiment of the belt drive mechanism. FIGS. 5B and 5C illustrate two different embodiments for coupling the plate 206 206A or 206B, respectively, of the belt drive mechanism 201 to the frame 102 of the tape drive 100.

In the embodiment of the belt drive mechanism of FIG. 5A, a motor support 254, mounted on the plate 206, couples the motor 202 to the plate 206. A wheel 230 rotates about a shaft 232 stationarily connected to the plate 206. A belt 222 is wrapped around the motor 202 and the wheel 230 to convey the rotational motion of the motor 202 to the wheel 230. The exterior surface of belt 222 is in contact with cartridge roller 16. Thus the movement of the motor 202 is transferred from the motor 202 to the belt 222 to cause the rotation of the cartridge roller 16.

The belt 222 is pinched between the wheel 230 and the cartridge roller 16 of the tape cartridge 10. A sufficient pinch force is used such that the friction between the belt 222 and the cartridge roller 16 causes the cartridge roller 16 to rotate as the belt 222 is moved by the rotation of the motor 202. If the belt 222 passes between two hard surfaces, the belt 222 is subjected to a very high squeezing pressure (pounds per square inch). Over time, such a pressure will severely damage or destroy the belt, leading to tape drive failures.

To prevent such problems, certain embodiments of the present invention incorporate an elastomeric material 236 provided around the periphery of the wheel 230 to cushion the belt 222 where the belt 222 is pinched against the cartridge roller 16. The pinch force forces the belt 222 to sink slightly into the elastomeric material, as depicted in detail in FIG. 5D. When the cartridge roller 16 is pushed against the belt 222 during the insertion of the tape cartridge 10, the elastomeric cushion 236 allows the belt 222 to wrap slightly around the cartridge roller 16, thereby increasing the contact area of the belt 222 on the cartridge roller 16.

The increase in contact area produces more reliable contact between the belt 222 and the cartridge roller 16 for transfer of the motor rotation, and the larger contact area reduces the pressure per square inch on the belt 222 whereby extending the useful life of the belt 222. Although an elastomeric cushion is described, other embodiments of the present invention reduce the contact pressure on the belt in other manners, as will be appreciated by one of ordinary skill in the art, such as the use of materials other than elastomeric materials on the wheel 230. In certain embodiments, an elastomeric coating is provided on the belt.

In the embodiment of FIG. 5B, a pivot pin 212 is fixed to frame 102. The plate 206A of drive 200 pivots about pin 212. Torsion spring 214 is wrapped about pin 212 such that one leg of the spring 214 bears against frame 102 while the other leg is biased toward plate 206A. This bias rotates drive 201 clockwise until an extension of plate 206B contacts arresting pin 240 fixed to frame 102 (see, FIG. 5C) The spring 214 is slightly biased prior to the insertion of the tape cartridge 10 into the slot 104 of the frame 100. When the cartridge 10 is inserted into the slot 104, the cartridge roller 16 contacts the belt 222 wrapped around the wheel 230.

The force created by the insertion of the tape cartridge 10 pivots the drive 201 about the pin 212. The movement of the drive 201 increases the bias of spring 214 such that a firm contact is created between the cartridge roller 16 and the belt 222 (see FIG. 5D)

In the embodiment of FIG. 5C, the frame 102 includes guides 238. Plate 206 slides within guides 238 such that motion of drive 201 is restricted to move toward or away from the cartridge end of the drive. A spring 244, located between a ledge 108 of the frame 102 and the plate 206B, biases drive 200 toward the front 103 of tape drive 100 until arrested by pin 240 fixed to frame 102. When the cartridge 10 is inserted into the slot 104, the cartridge roller 16 contacts the belt 222 wrapped around the wheel 230.

The continuing force created by the insertion of the cartridge 10 further compresses the spring 244 as the plate 206B linearly moves in a horizontal plane of the frame 102. The horizontal movement in the longitudinal direction is guided by the guides 238. When the tape cartridge 10 is completely inserted, the biasing caused by the compression of the spring 244 assures a firm belt/cartridge roller contact, as well as the slight wrapping of belt 222 around the cartridge roller 16.

Figure 6A:
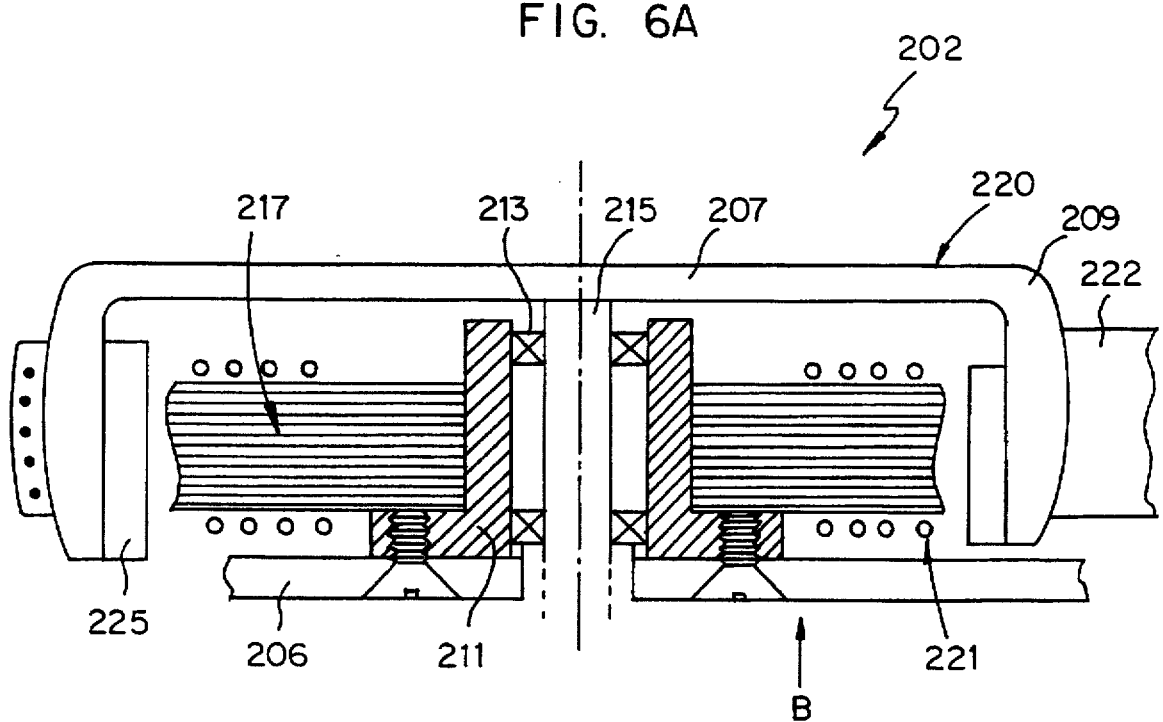
FIG. 6A is a cross-section of a motor that is used in certain embodiments of the present invention.
Figure 6B:
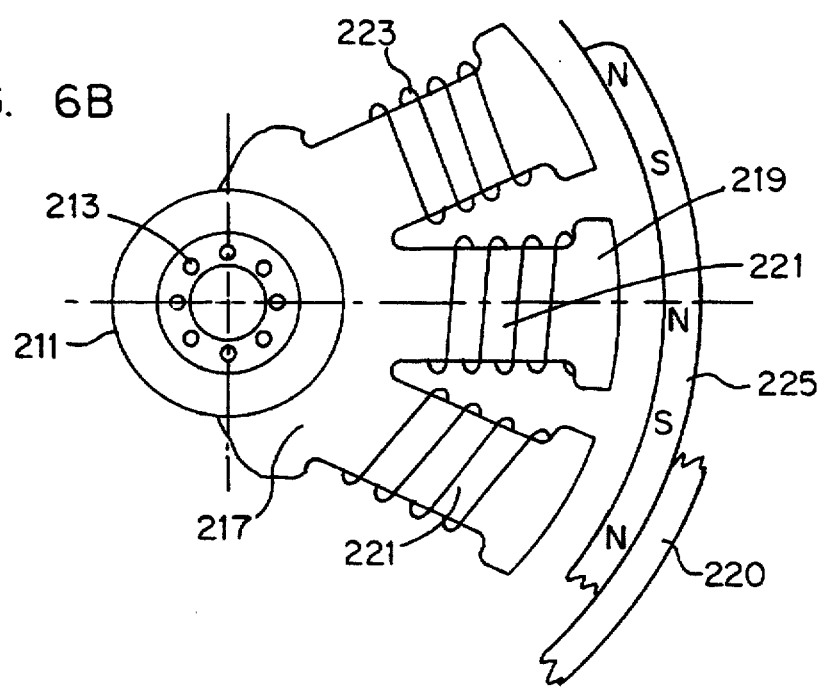
FIG. 6B is a view in the direction of arrow B in FIG. 6A of a portion of the motor.

FIGS. 6A and 6B provide different views of a motor 202 that can be used in the present invention. The top end of the motor shaft is shaped as a disk 207. The shaft then forms a cylinder 209 extending down from the disk 207 and surrounding the interior of the motor 202. This cylinder 209 forms the pulley 220 for the belt 222.

The stationary part attached to the plate 206 is a hollow spindle 211. Inside the spindle 211 are ball bearings 213 supporting a vertical member 215 of the shaft. Attached to the outside of the spindle 211 are thin iron alloy laminations 217 shaped to have magnetic pole tips 219 and arms 221 around which are wound the magnet wire windings 223. Affixed to the inner wall of the cylinder 209 is a ferrite ring 225 permanently magnetized with alternating regions of north and south poles. The windings 223 are connected in preferred embodiments in the conventional three phase connection pattern. When alternating current is applied to each phase winding 221 in sequence, the pole tips 219 set up a rotating magnetic field that causes the ferrite ring 225 to rotate in synchronism.

Since the increased height created by a counter-shaft and pulley of the conventional pulley-belt drive mechanisms is eliminated, the tape drive of the present invention is more compact. Tape drives incorporating the pulley-belt drive of the present invention are also more reliable due to decreased moving components and improved contact between the belt 222 and the cartridge roller 16. The elimination of the counter-shaft and the wheel decreases the parts costs for manufacturing the tape drive. Further, the time to assemble the tape drive is reduced since fewer parts have to be assembled. While the present invention has been described with respect to specific embodiments thereof, it is evident that many alternatives, modifications and variations will be apparent to those skilled in the art. For example, although a rectangular cartridge has been exemplified, the present invention is applicable to other types of tape recorders requiring movement of a roller to cause tape motion. The present invention is applicable to other types of recording medium requiring movement to read/write information. Further, all references cited in the specification, and their references, are incorporated by reference herein where appropriate for teachings of additional or alternative details, features, and/or technical background.

Although the present invention has been described and illustrated in detail, it is clearly understood that the same is by way of illustration and example only and is not to be taken by way of limitation, the spirit and scope of the present invention being limited only by the terms of the appended claims.

We claim:

1. A drive mechanism for driving a tape comprising:
   a driver assembly comprising:
      a driving pulley;
      an idler pulley in substantially fixed, spaced apart spacial relationship to said driving pulley; and
      a driving belt around said driving pulley and said idler pulley in driven contact with said driving pulley and in driving contact with said idler pulley;
   a cartridge assembly, separate from said driver assembly, comprising:
      a cartridge roller; winding means adapted to carry recording tape wound thereon; and
      recording tape wound on said winding means and in effective rolling contact with said cartridge roller; and
   means to engage said driver assembly with said cartridge assembly, whereby juxtaposing said cartridge roller, said driving belt, and said idler pulley in mutual contact;
   wherein, when engaged, said driving belt drives said cartridge roller and said idler pulley;
   wherein, when engaged, said cartridge roller is substantially coplanar with said driving belt; and
   wherein said recording tape is driven in juxtaposition to said cartridge roller.

2. A drive mechanism for driving a tape as claimed in claim 1, further comprising a motor in driving engagement with said driving pulley.

3. A drive mechanism for driving a tape as claimed in claim 1, wherein said driving belt partially wraps said cartridge roller.

4. A drive mechanism for driving a tape as claimed in claim 1, further comprising a housing for said driver assembly, and wherein said driving pulley and said idler pulley are spaced apart and are both affixed to a support which is moveable in said housing.

5. A drive mechanism for driving a tape as claimed in claim 4, wherein said support is moveable in a direction toward and away from said cartridge assembly.

6. A drive mechanism for driving a tape as claimed in claim 5, wherein said support is pivotally engaged with said housing.

7. A drive mechanism for driving a tape as claimed in claim 4, wherein said support is biased toward engagement of said idler pulley with said cartridge assembly, and further comprising means to move said support against said bias when said cartridge roller engages with said idler pulley through said driving belt.

8. A drive mechanism for driving a tape as claimed in claim 4, further comprising at least one guide in fixed relationship to said driving assembly in a position to guide the movement of said support.

9. A drive mechanism for driving a tape as claimed in claim 1, further comprising a cushion between said driving belt and said idler pulley.

10. A drive mechanism for driving a tape as claimed in claim 9, wherein said cushion substantially covers at least so much of the surface of said idler pulley that is in engagement with said driving belt and said cartridge roller.

11. A drive mechanism for driving a tape as claimed in claim 9, wherein said cushion comprises an elastomeric material.

12. A drive mechanism for driving a tape as claimed in claim 1, further comprising said recording tape being disposed in driven relationship between said driving belt and said cartridge roller.

13. A drive mechanism for driving a tape as claimed in claim 12, wherein said contact between said idler pulley and said cartridge roller comprises in sequence: said idler pulley, said driving belt, and said cartridge roller in respective, serial, mutual contact.

14. A method of moving a recording tape which comprises:
   winding a recording tape about a winding means and a cartridge roller in a cartridge assembly;
   disposing a driving pulley, a driving belt and an idler pulley in a driving assembly, wherein said driving belt is adapted to be disposed in at least partial driving contact with said idler pulley and said driving pulley;
   disposing said idler pulley in substantially fixed spacial relationship to said driving pulley and said driving belt;
   bringing said cartridge assembly into juxtaposition with said driving assembly whereby positioning said driving belt between, and in effective contact with, both of said cartridge roller and said idler pulley;
   disposing the plane of said cartridge roller in a plane that is substantially parallel to the plane of said driving belt;
   driving said driving belt, whereby turning said idler pulley and said cartridge roller; and
   thereby moving said recording tape about said cartridge roller and said winding means.

15. A method of moving a recording tape as claimed in claim 14, further comprising:
   disposing said driving pulley and said idler pulley on a support;
   biasing said support toward said cartridge roller, when said cartridge assembly is engaged with said driving assembly;
   forcing said cartridge roller against said idler pulley such as to move said support against said bias; and thereby
   forcing said idler pulley, driving belt, and cartridge roller into more intimate contact with each other than in the absence of said biasing.

16. A method of moving a recording tape as claimed in claim 14, further including:
   providing cushioning on the periphery of said idler pulley in contact with said driving belt;
   moving said idler pulley and said cartridge roller toward each other with sufficient force to depress said cushioning; and
   thereby causing said driving belt to partially wrap said cartridge roller.

17. A method of moving a recording tape as claimed in claim 14, further including:
   disposing said driving assembly in a housing;
   disposing said driving pulley and said idler pulley on a support in said housing;
   disposing at least one guide in substantially fixed relationship to said housing and in effective contact with said support; and
   guiding said support toward and away from said cartridge roller by said guide.

* * * * *